US012583059B2

(12) United States Patent
Thuo et al.

(10) Patent No.: US 12,583,059 B2
(45) Date of Patent: *Mar. 24, 2026

(54) SOLDER PASTE ON DEMAND APPARATUS

(71) Applicant: THE INDIUM CORPORATION OF AMERICA, Clinton, NY (US)

(72) Inventors: Martin Thuo, Apex, NC (US); Ian Tevis, Ames, IA (US); Darin Heisterkamp, Story City, IA (US)

(73) Assignee: THE INDIUM CORPORATION OF AMERICA, Clinton, NY (US)

( * ) Notice: Subject to any disclaimer, the term of this patent is extended or adjusted under 35 U.S.C. 154(b) by 466 days.

This patent is subject to a terminal disclaimer.

(21) Appl. No.: 18/185,788

(22) Filed: Mar. 17, 2023

(65) Prior Publication Data

US 2023/0278145 A1 Sep. 7, 2023

Related U.S. Application Data

(63) Continuation-in-part of application No. 17/855,942, filed on Jul. 1, 2022, now Pat. No. 11,633,702.

(Continued)

(51) Int. Cl.
*B23K 35/02* (2006.01)
*B22F 1/08* (2022.01)
(Continued)

(52) U.S. Cl.
CPC .............. *B23K 35/025* (2013.01); *B22F 1/08* (2022.01); *B22F 1/142* (2022.01); *B23K 3/0638* (2013.01)

(58) Field of Classification Search
CPC ................ B23K 35/025; B23K 3/0638; B23K 35/0244; B22F 1/08; B22F 1/142; B22F 1/10; B22F 1/107; B22F 1/147; B22F 1/17

See application file for complete search history.

(56) References Cited

U.S. PATENT DOCUMENTS 6,416,590 B1 * 7/2002 Hirata ................ B23K 35/0244
75/739
2003/0177865 A1 9/2003 Ono et al.
(Continued)

OTHER PUBLICATIONS

Tevis et al., "Synthesis of Liquid core-Shell Particles and Solid Patchy Multicomponent Particles by Shearing Liquids Into Complex Particles (SLICE)," Langmuir, vol. 30, No. 47, Nov. 18, 2014, pp. 14308-14313.

(Continued)

*Primary Examiner* — Rebecca Janssen
(74) *Attorney, Agent, or Firm* — Sheppard, Mullin, Richter & Hampton LLP

(57) ABSTRACT

A system and method are presented for producing solder paste having undercooled metallic core-shell particles. In one or more arrangements, the system includes a reconstitution assembly, a dispenser assembly, and a mixer, among other components. The reconstitution assembly is configured to place the cores of the solid core metallic core-shell particles into an undercooled liquid state to form a plurality of undercooled metallic core-shell particles. The dispenser assembly is configured to dispense one or more of a set of available flux components. The mixer assembly is configured to mix the one or more of the set of flux components dispensed by the dispenser assembly with the plurality of undercooled metallic core-shell particles formed by the reconstitution assembly to form a solder paste.

22 Claims, 9 Drawing Sheets

Related U.S. Application Data

(60) Provisional application No. 63/371,994, filed on Aug. 19, 2022, provisional application No. 63/219,152, filed on Jul. 7, 2021.

(51) Int. Cl.
| | |
|---|---|
| *B22F 1/142* | (2022.01) |
| *B23K 3/06* | (2006.01) |

(56) References Cited

U.S. PATENT DOCUMENTS

| | | | |
|---|---|---|---|
| 2014/0090752 A1 | 4/2014 | Waniuk et al. | |
| 2017/0014958 A1 | 1/2017 | Thuo et al. | |
| 2017/0326523 A1 | 11/2017 | Thuo et al. | |
| 2019/0203327 A1* | 7/2019 | Thuo .................... | B22F 7/064 |

OTHER PUBLICATIONS

Extended European Search Report dated Oct. 30, 2024 for European Application No. EP21916393.8.
Non-final Office Action dated Jan. 28, 2025 for U.S. Appl. No. 18/452,441.

* cited by examiner

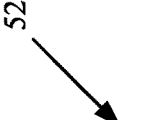
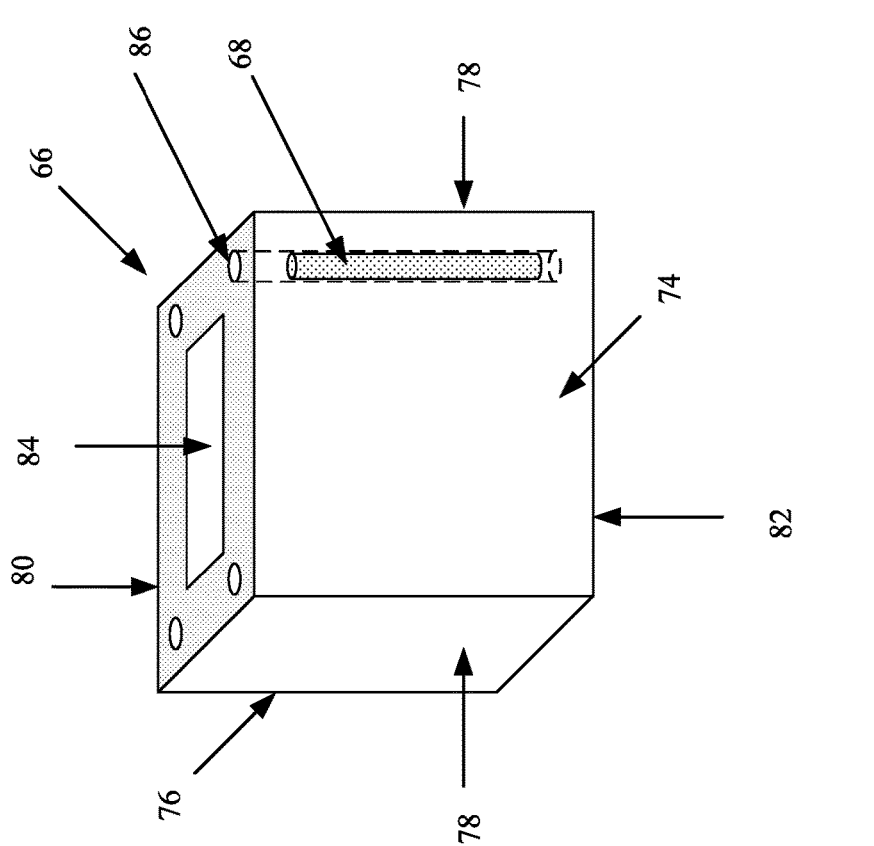
FIG. 2

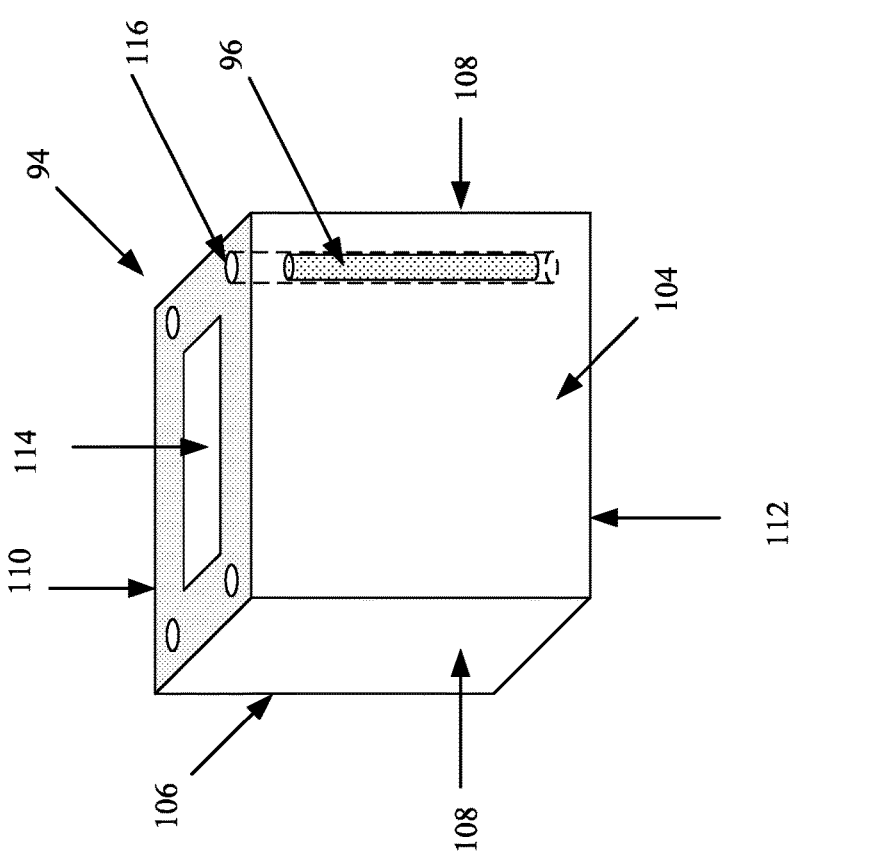
FIG. 3

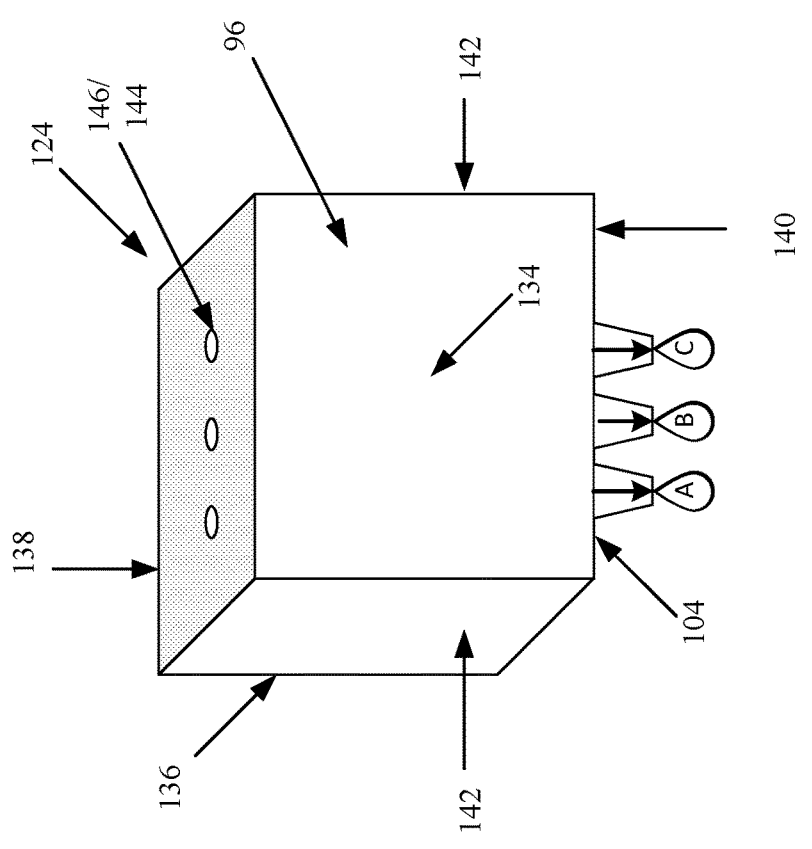
FIG. 4

12

20

18

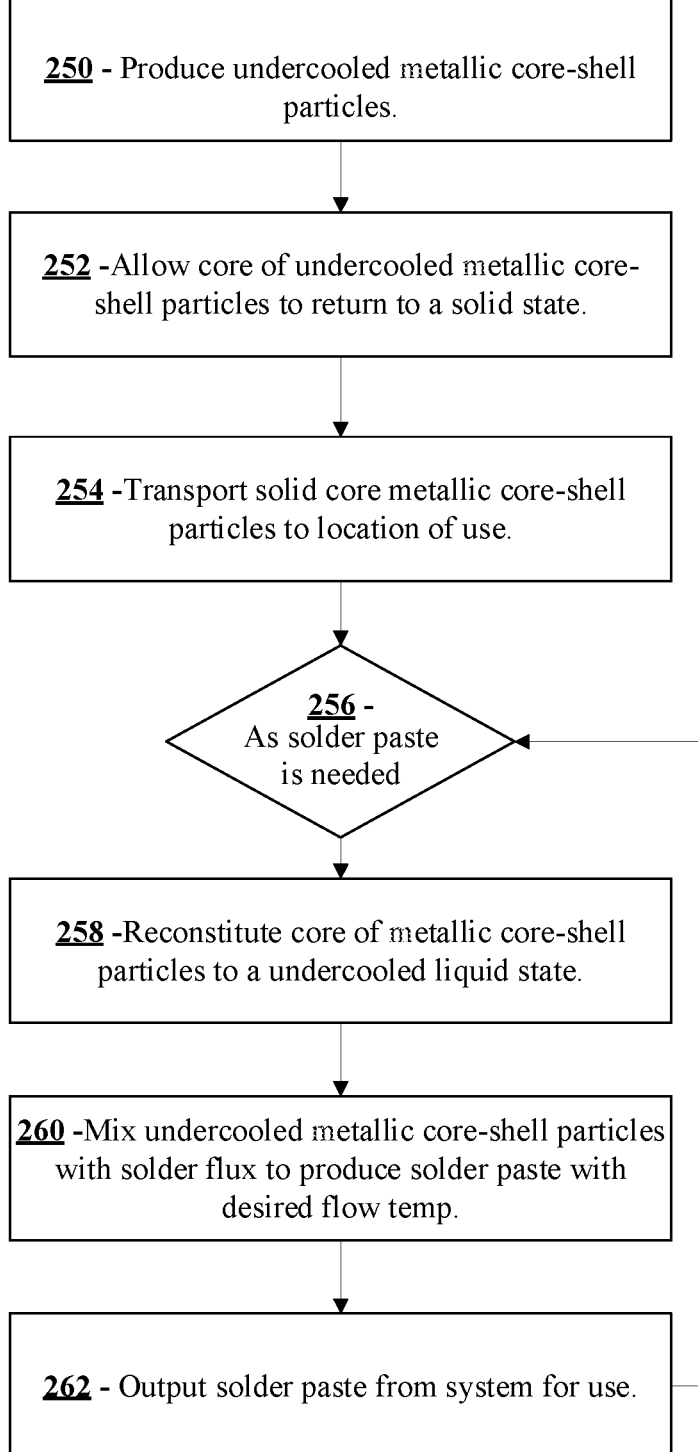

250 - Produce undercooled metallic core-shell particles.

252 - Allow core of undercooled metallic core-shell particles to return to a solid state.

254 - Transport solid core metallic core-shell particles to location of use.

256 - As solder paste is needed

258 - Reconstitute core of metallic core-shell particles to a undercooled liquid state.

260 - Mix undercooled metallic core-shell particles with solder flux to produce solder paste with desired flow temp.

262 - Output solder paste from system for use.

FIG. 7

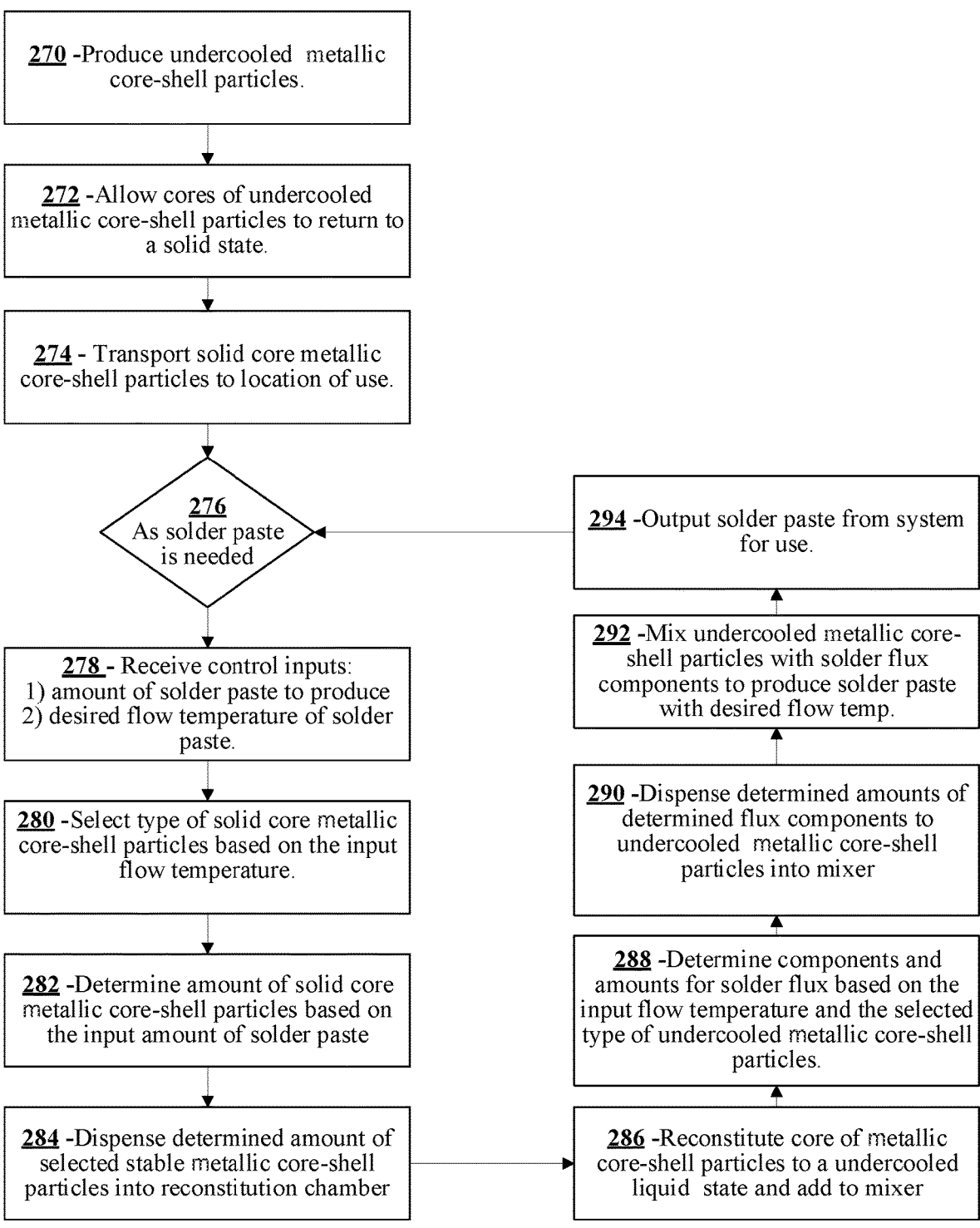

270 -Produce undercooled metallic core-shell particles.

272 -Allow cores of undercooled metallic core-shell particles to return to a solid state.

274 - Transport solid core metallic core-shell particles to location of use.

276 As solder paste is needed

278 - Receive control inputs:
1) amount of solder paste to produce
2) desired flow temperature of solder paste.

280 -Select type of solid core metallic core-shell particles based on the input flow temperature.

282 -Determine amount of solid core metallic core-shell particles based on the input amount of solder paste 284 -Dispense determined amount of selected stable metallic core-shell particles into reconstitution chamber 294 -Output solder paste from system for use.

292 -Mix undercooled metallic core-shell particles with solder flux components to produce solder paste with desired flow temp.

290 -Dispense determined amounts of determined flux components to undercooled metallic core-shell particles into mixer 288 -Determine components and amounts for solder flux based on the input flow temperature and the selected type of undercooled metallic core-shell particles.

286 -Reconstitute core of metallic core-shell particles to a undercooled liquid state and add to mixer

FIG. 8

SOLDER PASTE ON DEMAND APPARATUS

CROSS REFERENCE TO RELATED APPLICATIONS

This application is a continuation in part of U.S. patent application Ser. No. 17/855,942, titled "SOLDER PASTE ON DEMAND APPARATUS", filed on Jul. 1, 2022, and issued as U.S. Pat. No. 11,633,702 on Apr. 25, 2023, which claims priority to U.S. Provisional Application No. 63/219, 152, titled "SOLDER PASTE ON DEMAND APPARATUS", and filed on Jul. 7, 2021, the entirety of each of which is hereby incorporated by reference herein. This application also claims priority to U.S. Provisional Application No. 63/371,994, titled "METHODS AND APPARATUSES FOR SUPERCOOLED MICRO-CAPSULES", and filed Aug. 19, 2022, the entirety of which is hereby incorporated by reference herein.

FIELD OF THE DISCLOSURE

The present disclosure relates to solder paste and more particularly to systems and methods for the manufacture of solder paste containing undercooled metallic core-shell particles such as micro/nano particles.

OVERVIEW OF THE DISCLOSURE

Conventional solder pastes contain a thick medium called flux and powder metal solder suspended in the flux. Flux acts as a temporary adhesive, holding the suspended powder metal solder in place until the soldering process melts the solder and fuses the parts together, which is facilitated by the chemistry of the flux. Production and soldering methodology requires the solder paste to be heated to the melting point of the metal solder. For some applications, such heating creates risk that electronic components being soldered may be damaged, have lower manufacturing yields, or reduced in lifespan. Another problem with conventional solder pastes is that the solder pastes have a limited shelf life (typically 6 months) once the powdered metal solder is exposed to air or mixed with the solder flux components due to chemical interactions with the powder metal solder. Many solder pastes also require cold transportation and storage to achieve maximum shelf life (typically 6 months).

Thus, it is a primary object of the disclosure to provide a method and apparatus for manufacture of solder paste that improves upon the state of the art.

Another object of the disclosure is to provide a method and apparatus for manufacture of solder paste that includes undercooled metallic core-shell particles.

Yet another object of the disclosure is to provide a method and apparatus for manufacture of solder paste that avoids logistical constraints presented by the shelf life of solder pastes.

Another object of the disclosure is to provide a method and apparatus for manufacture of solder paste that increases shelf life of individual solder paste components.

Yet another object of the disclosure is to provide a method and apparatus for manufacture of solder paste that can flow high temperature solders at lower temperatures than conventional solder pastes.

Another object of the disclosure is to provide a method and apparatus for manufacture of solder paste that eliminates the need for cold transportation and storage.

Yet another objective of the disclosure is to provide a method and apparatus for manufacture of solder paste that eliminates the need to let solder paste reach equilibrium temperature before use.

Another object of the disclosure is to provide a method and apparatus for manufacture of solder paste that permits a sample to be removed for analysis and/or certification.

Yet another object of the disclosure is to provide a method and apparatus for manufacture of solder paste that can be customized for different solder applications.

Another object of the disclosure is to provide a method and apparatus for manufacture of solder paste that is adaptable for manufacture of different products.

Yet another object of the disclosure is to provide an easy to use method and apparatus for manufacture of solder paste.

Another object of the disclosure is to provide a method and apparatus for manufacture of solder paste that improves functionality.

Yet another object of the disclosure is to provide a method and apparatus for manufacture of solder paste that improves process efficiencies, reduces waste and increases flexibility.

Another object of the disclosure is to provide an apparatus for manufacture of solder paste that uses a minimum number of parts.

Yet another object of the disclosure is to provide a durable apparatus for manufacture of solder paste.

Another object of the disclosure is to provide an apparatus with a long useful life for manufacture of solder paste.

These and other objects, features, or advantages of the present disclosure will become apparent from the specification, claims and drawings.

SUMMARY OF THE DISCLOSURE

In one or more arrangements, a system and method are presented for producing solder paste having undercooled metallic core-shell particles. "Undercooled" metallic core-shell particles have a metallic core surrounded by a shell with the core in a metastable liquid state at a temperature below a melting point of the core. In one or more arrangements, the system includes a set of containers, a reconstitution assembly, a dispenser assembly, and a mixer, among other components.

In one or more arrangements, the system includes a first transfer mechanism configured to transfer undercoolable metallic core-shell particles from one of the set of containers to the reconstitution assembly. "Undercoolable" metallic core-shell particles are solid core metallic core-shell particles having a metallic core surrounded by a shell and which are capable of having the solid cores reconstituted to place the cores into an undercooled liquid state, thereby resulting in undercooled metallic core-shell particles. As used herein, reconstitution of cores refers to any process to transform the cores metallic core-shell particles from a solid state to a liquid undercooled state (e.g., by heating the particles above a melting point of the solid core and cooling the particles to place the cores into an undercooled liquid state), thereby resulting in undercooled metallic core-shell particles. Undercoolable metallic core-shell particles may alternatively be referred to as solid core metallic core-shell particles and such terms are used interchangeably herein.

The first transfer mechanism is also configured to transfer a set of flux components from one or more of the set of containers to the dispenser assembly.

The reconstitution assembly is configured to place the cores of the solid core metallic core-shell particles into an undercooled liquid state to form a plurality of undercooled metallic core-shell particles. The dispenser assembly is configured to dispense one or more of the available set of flux components, which combine to form a solder flux. The mixer assembly is configured to mix the one or more of the set of flux components dispensed by the dispenser assembly with the plurality of undercooled metallic core-shell particles formed by the reconstitution assembly to form a solder paste.

In one or more arrangements, the system includes a process control system configured to control operation of the reconstitution assembly, the dispenser assembly, and the mixer to produce the solder paste. In one or more arrangements, the process control system is configurable by a user to cause the reconstitution assembly, the dispenser assembly, and the mixer to produce the solder paste having one or more characteristics specified by the user. In one or more arrangements, such user configurable characteristics may include but are not limited to, for example, flow temperature, viscosity, slump, working life, tack, response-to-pause, electrical conductivity, ionic conductivity, cleanability, rollability, stencil release, brick height and/or color, among other solder paste characteristics.

BRIEF DESCRIPTION OF THE DRAWINGS

FIG. 2 shows a heating stage assembly of a reconstitution assembly for use in a system for manufacture of solder paste, in accordance with one or more arrangements.

FIG. 3 shows a cooling stage assembly of a reconstitution assembly for use in a system for manufacture of solder paste, in accordance with one or more arrangements.

FIG. 4 shows a dispenser assembly for use in a system for manufacture of solder paste, in accordance with one or more arrangements.

FIG. 7 shows an example process for producing solder having undercooled metallic core-shell particles on demand, in accordance with one or more arrangements.

FIG. 8 shows an example process for producing solder having undercooled metallic core-shell particles on demand, in accordance with one or more arrangements.

DETAILED DESCRIPTION OF THE DISCLOSURE

Figure 1:
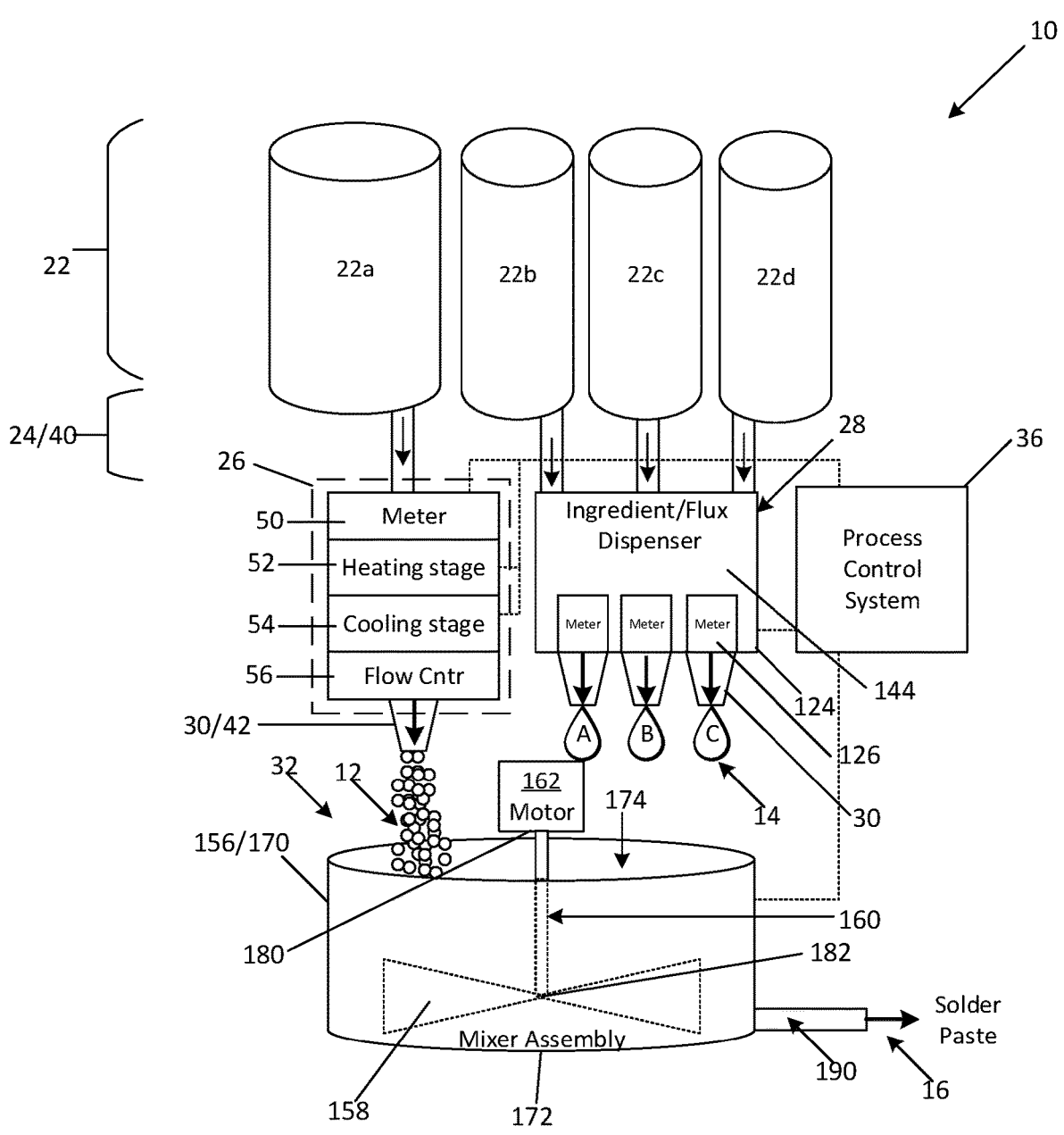
FIG. 1 shows a system for manufacture of solder paste, in accordance with one or more arrangements.
Figure 5:
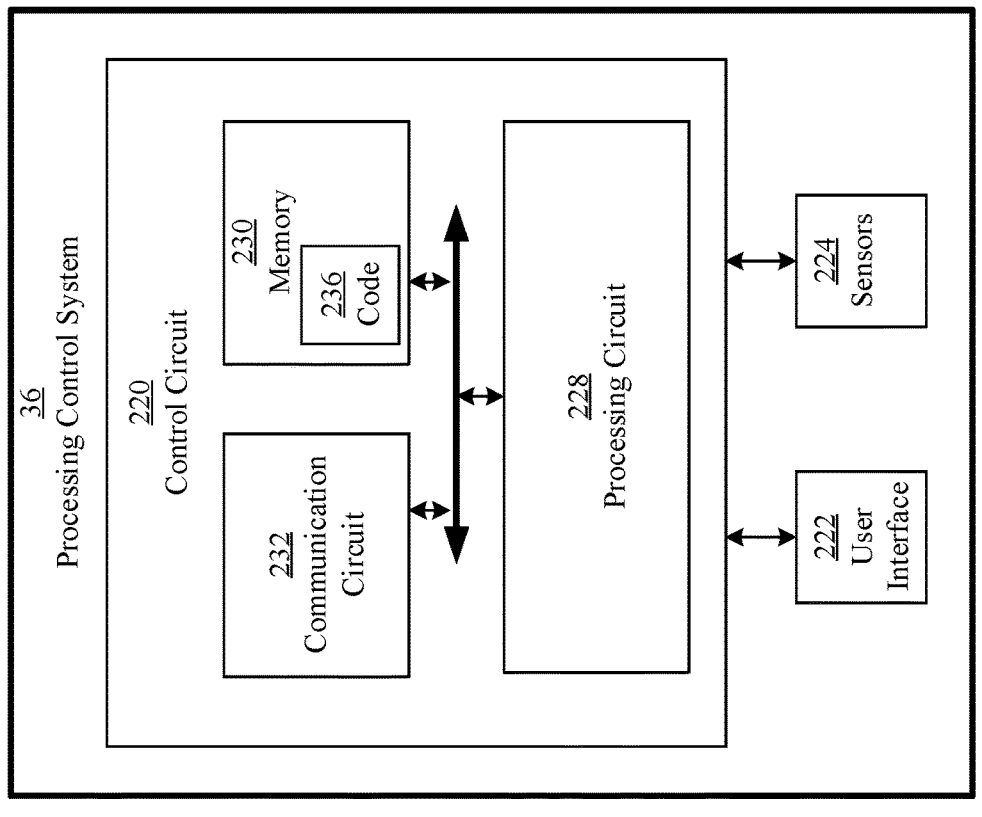
FIG. 5 shows a processing control system for use in a system for manufacture of solder paste, in accordance with one or more arrangements.
Figure 6:
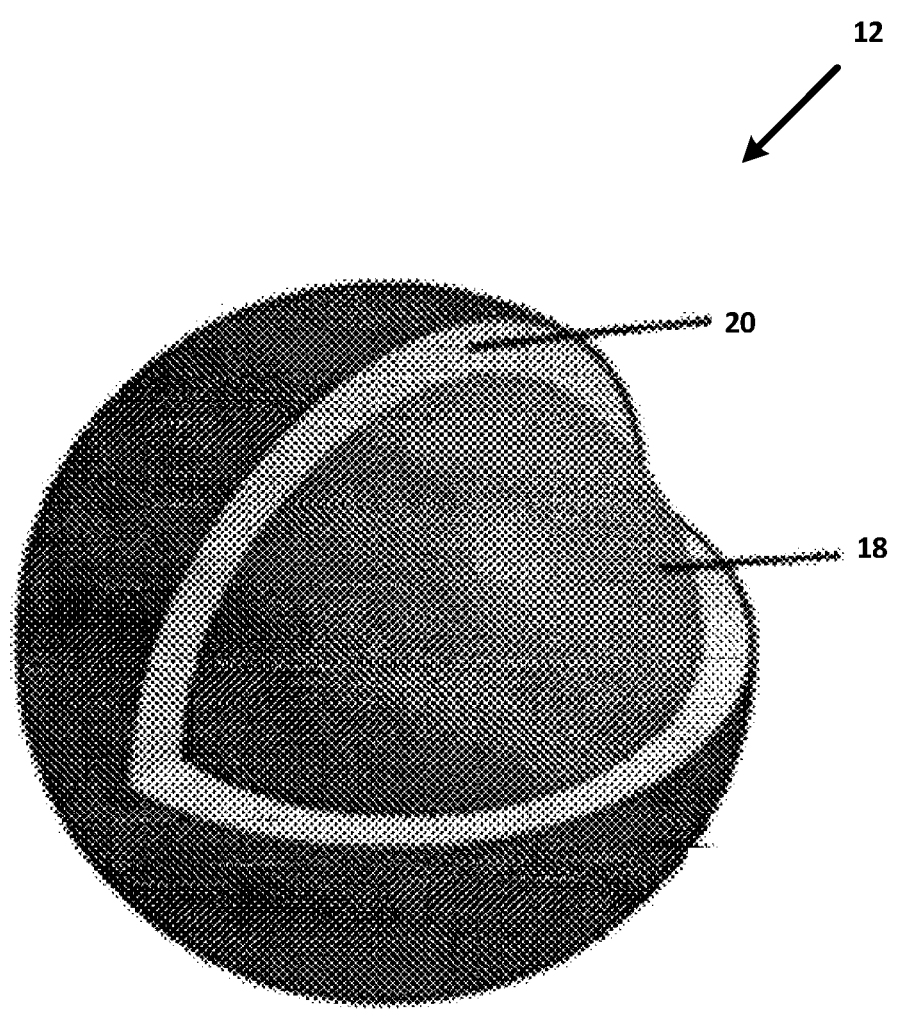
FIG. 6 shows an example metallic core shall particle, in accordance with one or more arrangements.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the disclosure. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the disclosure that may be described herein. The contemplated embodiments are not so limited and should not be interpreted as being restricted to embodiments which address such objects of the disclosure. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer", and the like as may be used herein, merely describe points of reference and do not limit the present disclosure to any particular orientation or configuration.

As used herein, the term "or" includes one or more of the associated listed items, such that "A or B" means "either A or B". As used herein, the term "and" includes all combinations of one or more of the associated listed items, such that "A and B" means "A as well as B." The use of "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods.

Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually, or sequentially, to provide looping or other series of operations aside from single operations described below. It should be presumed that any embodiment or method having features and functionality described below, in any workable combination, falls within the scope of example embodiments.

As used herein, various disclosed embodiments may be primarily described in the context of producing solder paste using undercooled metallic core-shell particles. However, the embodiments are not so limited. It is appreciated that the embodiments may be adapted for use in other applications and/or for manufacture of other items, which may be improved by the disclosed structures, arrangements and/or methods. The system is merely shown and described as being used in the context of producing solder paste having undercooled metallic core-shell particles for ease of description and as one of countless examples.

In one or more arrangements, an improved solder paste 16 is provided, in which metallic core-shell particles 12 are used in lieu of powder metal solder. Metallic core-shell particles 12 have a shell 20 formed around a metallic core 18, which core 18 can be undercooled inside the shell 20. Undercooling of metals (also known as supercooling) refers to the cooling of a liquid metal or alloy below its melting/freezing point without it becoming solid. Due to the metastable nature of undercooled metals, the production of undercooled metal in practical yields and at any size scale is a particular challenge, especially where large undercooling values are desired. Methods and systems for producing undercooled metallic core-shell particles 12 are described in PCT Patent Publication WO2017011029 titled "STABLE UNDERCOOLED METALLIC PARTICLES FOR ENGINEERING AT AMBIENT CONDITIONS"; U.S. Pat. No. 10,266,925 titled "STABLE UNDERCOOLED METALLIC PARTICLES FOR ENGINEERING AT AMBIENT CONDITIONS"; U.S. Patent Publication 2018/0354037 titled "DIRECT PRINTING AND WRITING USING UNDERCOOLED METALLIC CORE-SHELL PARTICLES"; and U.S. Provisional Patent Application No. 63/133,537 titled "SYSTEM FOR MANUFACTURE OF UNDERCOOLED METALLIC CORE-SHELL PARTICLES" and filed Jan. 4, 2021, all of which are hereby fully incorporated by reference herein.

The use of metallic core-shell particles 12 in lieu of conventional powder metal solder allows the solder paste 16 to be flowed at a lower temperature than the melting point of the metal core 18. The shell 20 of metallic core-shell particles 12 may also protect the metal core 18 from chemical reactions and/or physical transformations and thereby increases shelf life. However, it is recognized that it is difficult to ship and store metallic core-shell particles 12 while maintaining the cores 18 in the undercooled liquid state.

In one or more arrangements, an apparatus or system is disclosed for production of solder paste 16 on-demand from metallic core-shell particles 12 where cores 18 of some or all of the metallic core-shell particles 12 are in a solid state. This approach permits metallic core-shell particles 12 to be transported to and stored on location without a special supply chain or special handling, and then reconstituted to the undercooled liquid state and used to form solder paste 16 on demand when needed. In this manner, problems associated with shelf life of solder paste 16 are avoided. This approach also permits characteristics of solder paste 16 (e.g., flow temperature, viscosity, slump, working life, tack, response-to-pause, electrical conductivity, ionic conductivity, cleanability, rollability, stencil release, brick height, etc.) to be customized by a user for different applications.

Solder On Demand Apparatus 10:

With reference to the figures, an apparatus 10 for the on demand manufacture of solder paste 16 using undercooled metallic core-shell particles 12 (also referred by as Solder paste On Demand Apparatus 10, SODA 10, or simply apparatus 10 or system 10) is presented. SODA 10 is formed of components of any suitable size, shape, design, technology, and in any arrangement or configuration to reconstitute the cores 18 of metallic core-shell particles 12 from the solid state into an undercooled liquid state, and facilitate mixing of the undercooled metallic core-shell particles 12 with flux components 14 to form solder paste 16.

In an arrangement shown, as one example, SODA 10 includes containers 22, a first transfer mechanism 24, a reconstitution assembly 26, a dispenser assembly 28, a second transfer mechanism 30, a mixer assembly 32, and a process control system 36 among other components.

In the example arrangement shown, containers 22, reconstitution assembly 26, dispenser assembly 28, mixer assembly 32, and process control system 36 are shown as separated components. However, the embodiments are not so limited. Rather, it is contemplated that in one or more arrangements, containers 22, reconstitution assembly 26, dispenser assembly 28, mixer assembly 32, process control system 36, and/or various other components of system 10 may be implemented together in a shared enclosure or housing.

Containers 22:

Containers 22 are formed of any suitable size, shape, and design and are configured to receive and hold solid core metallic core-shell particles 12, flux components 14, and/or other inputs to SODA 10. In the arrangement shown, as one example, containers 22 are cylindrical shaped tanks having outputs/valves connected to transfer mechanism 24. However, the embodiments are not so limited. Rather, it is contemplated that in some various arrangements, containers 22 may include various means and methods for holding inputs of SODA 10 including but not limited to, for example, tanks, drums, bins, crates, boxes, carts, bags, pails, bottles, and/or any other type of container.

In the arrangement shown, containers 22 include one container 22a configured to hold metallic core-shell particles 12 and three containers 22b, 22c, and 22d configured to hold various fluxes and/or flux components 14. However, embodiments are not so limited. Rather, it is contemplated that in one or more arrangements, SODA 10 may include any number of containers 22 configured to hold any number of different metallic core-shell particles 12 and/or any number of fluxes and/or flux components 14.

Transfer Mechanism 24:

Transfer mechanism 24 is formed of any suitable size, shape, and design and is configured to transfer inputs (e.g., metallic core-shell particles 12, flux components 14 and other inputs to SODA 10) from containers 22 to reconstitution assembly 26 and dispenser assembly 28. In the arrangement shown, as one example, transfer mechanism 24 includes a set of pipes 40 configured to transfer metallic core-shell particles 12 from container 22a to reconstitution assembly 26 and transfer flux components 14 from containers 22b, 22c, and 22d to dispenser assembly 28. However, the embodiments are not so limited. Rather, it is contemplated that in some various different arrangements, transfer mechanisms 24 may be implemented using various means or methods for transferring material including but not limited to, for example, tubes, pipes, hoses, valves, pumps, nozzles, spigots, troughs, channels, spillways, conveyors, and/or any other method or means for transferring input materials.

Separating Apparatus 44:

Occasionally, undercooled metallic core-shell particles 12 will cling to each other and form clusters. In order to break up the clusters, in one or more arrangements, system 10 may include a separating apparatus 44 (not shown). Separating apparatus 44 is formed of any suitable size, shape, and design and is configured to break up or separate clusters of undercooled metallic core-shell particles 12. In some various arrangements, separating apparatus 44 may employ various methods or means for breaking up and/or separating clusters including but not limited to, for example, an agitator, sieve, vibrating sieve, separation membrane, filter, and/or other separating apparatus is herein contemplated. In one or more arrangements, such apparatus may be positioned between container 22a and reconstitution assembly 26 to break up, sieve, filter, or otherwise separate metallic core-shell particles 12. However the arrangements are not so limited. Rather, it is contemplated that in some arrangement a separating apparatus 44 may additionally or alternatively be positioned after reconstitution assembly 26 or any other location in system 10.

Reconstitution Assembly 26:

Reconstitution assembly 26 is formed of any suitable size, shape, and design and is configured to place the solid cores 18 of metallic core-shell particles 12 into an undercooled liquid state. In the arrangement shown, as one example, reconstitution assembly 26 includes a meter assembly 50, a heating stage assembly 52, a cooling stage assembly 54, and a flow control assembly 56.

Meter Assembly 50:

Meter assembly 50 is formed of any suitable size, shape, and design and is configured to receive metallic core-shell particles 12 with solid cores 18 from container 22a via transfer mechanism 24 and transfer measured amounts of the metallic core-shell particles 12 to heating stage assembly 52. In some various arrangements, meter assembly 50 may use various methods and means for metering including but not limited to, for example, fluted feed meters, cup feed meters, internal double run meters, cell feed meters, brush feed meters, auger feed meters, picker wheel meters, star wheel meters, differential pressure flow meters, velocity flow meters, positive displacement flow meters, mass flow meters, closed pipe flow meters, open channel flow meters, flow control valves, and/or any other means or method for dispersing amounts of materials.

In the arrangement shown, SODA 10 has one meter assembly 50 configured to provide one type of metallic core-shell particles 12 with solid cores 18 received from container 22a to reconstitution assembly 26 for processing. However, the embodiments are not so limited. Rather, it is contemplated that, in one or more arrangements, SODA 10 may have multiple meter assemblies 50 configured to provide multiple different types of metallic core-shell particles 12 to reconstitution assembly 26 for processing. Such arrangements may permit a user to select between different metallic core-shell particles 12 having different characteristics such as core alloy composition, shell composition, and particle size among other examples.

Heating Stage Assembly 52

Heating stage assembly 52 is formed of any suitable size, shape, and design and is configured to receive solid core metallic core-shell particles 12 with solid cores 18 from meter assembly 50 and heat the cores 18 of metallic core-shell particles 12 to the melting point of the material forming the cores 18 while preserving shells 20. In the arrangement shown, as one example, heating stage assembly 52 includes an enclosure 66 and a heating element 68 among other components.

Enclosure 66:

Enclosure 66 is formed of any suitable size, shape, and design and is configured to hold metallic core-shell particles 12 with solid cores 18 while heated by heating stage assembly 52. In the arrangement shown, as one example, enclosure 66 has a generally rectangular tube shape having a front 74, a back 76, and opposing sides 78 extending from an upper end 80 to a lower end 82. In this example arrangement, enclosure 66 has a hollow interior 84 extending from upper end 80 to a lower end 82.

In this example arrangement, enclosure 66 has holes 86 for insertion of heating elements 68. In this example arrangement, holes 86 extend from upper end 80 downward into enclosure 66. In this example arrangement, upper end 80 is connected to transfer mechanism 24 and lower end 82 is connected to cooling stage assembly 54. During operation, metallic core-shell particles 12 with solid cores 18 are heated by heating elements 68 as they move from upper end 80 to lower end 82 through hollow interior 84.

Heating Elements 68:

Heating elements 68 are formed of any suitable size, shape, and design and are configured to heat enclosure 66 and metallic core-shell particles 12 to a desired temperature during operation to liquify cores 18 as metallic core-shell particles 12 move through enclosure 66. In one or more arrangements, heating elements 68 are electric heating elements (such as block heating elements, electric coils, electric filaments, or the like). However, embodiments are not so limited. Rather, it is contemplated that in one or more arrangements, enclosure 66 may be heated using any type of heating system. Furthermore, it is contemplated that in one or more arrangements, heating elements 68 may additionally or alternatively be positioned within hollow interior 84 for direct heating of metallic core-shell particles 12.

Cooling Stage Assembly 54:

Cooling stage assembly 54 is formed of any suitable size, shape, and design and is configured to receive the heated metallic core-shell particles 12 from heating stage assembly 52 and cool metallic core-shell particles 12 placing the particles 12 into an undercooled liquid state. In the arrangement shown, as one example, cooling stage assembly 54 includes an enclosure 94 and a cooling element 96 among other components.

Enclosure 94:

Enclosure 94 is formed of any suitable size, shape, and design and is configured to hold metallic core-shell particles 12 with liquid cores 18 while cooled by cooling stage assembly 54. In the arrangement shown, as one example, enclosure 94 has a generally rectangular tube shape having a front 104, a back 106, and opposing sides 108 extending from an upper end 110 to a lower end 112. In this example arrangement, enclosure 94 has a hollow interior 114 extending from upper end 110 to lower end 112.

In this example arrangement, enclosure 94 has holes 116 for insertion of cooling elements 96. In this example arrangement, holes 116 extend from upper end 110 downward into enclosure 94. In this example arrangement, upper end 110 is connected to lower end 82 of enclosure 66 of heating stage assembly 52. During operation, hot metallic core-shell particles 12 with liquid cores 18 are cooled by cooling elements 96 as they move from upper end 110 to lower end 112 through hollow interior 114.

Cooling Elements 96:

Cooling elements 96 are formed of any suitable size, shape, and design and are configured to cool enclosure 94 and metallic core-shell particles 12 placing the metallic core-shell particles 12 into an undercooled liquid state as they move through enclosure 94. In one or more arrangements, cooling elements 96 are electric cooling elements (such as a Peltier cooling element). However, embodiments are not so limited. Rather, it is contemplated that in one or more arrangements, enclosure 94 may be cooled using any type of cooling system including but not limited to thermoelectric cooling elements, liquid cooling elements, heat pumps, or any other means or method for cooling. Furthermore, it is contemplated that in one or more arrangements, cooling elements 96 may additionally or alternatively be positioned within hollow interior 114 for direct cooling of metallic core-shell particles 12.

Flow Control Assembly 56:

In one or more arrangements, SODA 10 may include a flow control assembly 56 connected to lower end 112 of enclosure 94 of cooling stage assembly 54. Flow control assembly 56 is formed of any suitable size, shape, or design, and is configured to control the rate at which metallic core-shell particles 12 flow through heating stage assembly 52 and cooling stage assembly 54. In one or more various arrangements, flow control assembly 56 may include but is not limited to, for example, valves, priority vales, deceleration valves, apertures, flow regulators, bypass flow regulators, demand-compensated flow controls, pressure-compensated flow regulators, and any other method or device for controlling flow rate of materials.

In the arrangement shown, heating stage assembly 52 and cooling stage assembly 54 are separate components configured to process metallic core-shell particles 12 sequentially in a continuous flow type process. However, the embodiments are not so limited. Rather, it is contemplated that heating stage assembly 52 and cooling stage assembly 54 may be implemented together in the same enclosure and/or may be configured to process metallic core-shell particles 12 in batches. While some arrangement may be primarily described with reference to reconstitution of solid core metallic core-shell particles back into an undercooled state, the arrangements are not so limited. Rather, it is contemplated that in one or more arrangements, reconstitution assembly 26 may be configured to facilitate transition cores 18 of metallic core-shell particles 12 into various different states after undercooling including but not limited to, for example, a crystalline metal state, an amorphous metal state (also known as bulk metallic glass, metallic glass, glassy metal, or shiny metal), or any other state. Atoms of most metals are arranged in a crystalline structure in their natural solid state. In contrast, amorphous metals are non-crystalline and have a glass like structure.

In one or more arrangements, reconstitution assembly 26 is configured to transition cores 18 of metallic core-shell particles 12 into different states by controlling the degree to which cores 18 of metallic core-shell particles 12 are undercooled. In one or more arrangements, the degree of undercooling of metallic core shell particles 12 may be characterized as:

$$\text{Degree of Undercooling} = \frac{T_m - T_s}{T_m}$$

where $T_m$ is the melting temperature of the metal of the cores 18 and $T_s$ is the temperature that the core transition from an undercooled liquid state to a solid state. In one or more arrangements, reconstitution assembly 26 can produce undercooled metallic core-shell particles 12 having cores 18 undercooled to a degree of undercooling as low as 0.4.

In some various different arrangements, reconstitution assembly 26 may control the degree of undercooling via control of various variables in the reconstitution process. For example, in one or more arrangements, reconstitution assembly 26 may control the degree of undercooling by controlling the temperature and/or cooling rate of metallic core-shell particles 12 after heating cores 18 to a liquid state to control the degree of undercooling.

Although cooling rates and temperatures thresholds vary for different metals and alloys, generally speaking, transition metals from a liquid state an amorphous solid state generally requires the metal to be cooled and solidified rapidly (e.g., by extremely rapid cooling). In one or more arrangements, reconstitution assembly 26 can produce undercooled metallic core-shell particles 12 having core 18 that will solidify rapidly and transform into an amorphous metal state when shell 20 is damaged and/or dissolved by undercooling cores 18 of metallic core-shell particles 12 to a greater extent. Conversely, cores 18 of metallic core-shell particles 12 may be undercooled to a lesser extent to produce undercooled metallic core-shell particles 12 having core 18 that will solidify more slowing and transform into a crystalline metal state when shell 20 is broken.

Figure 9:
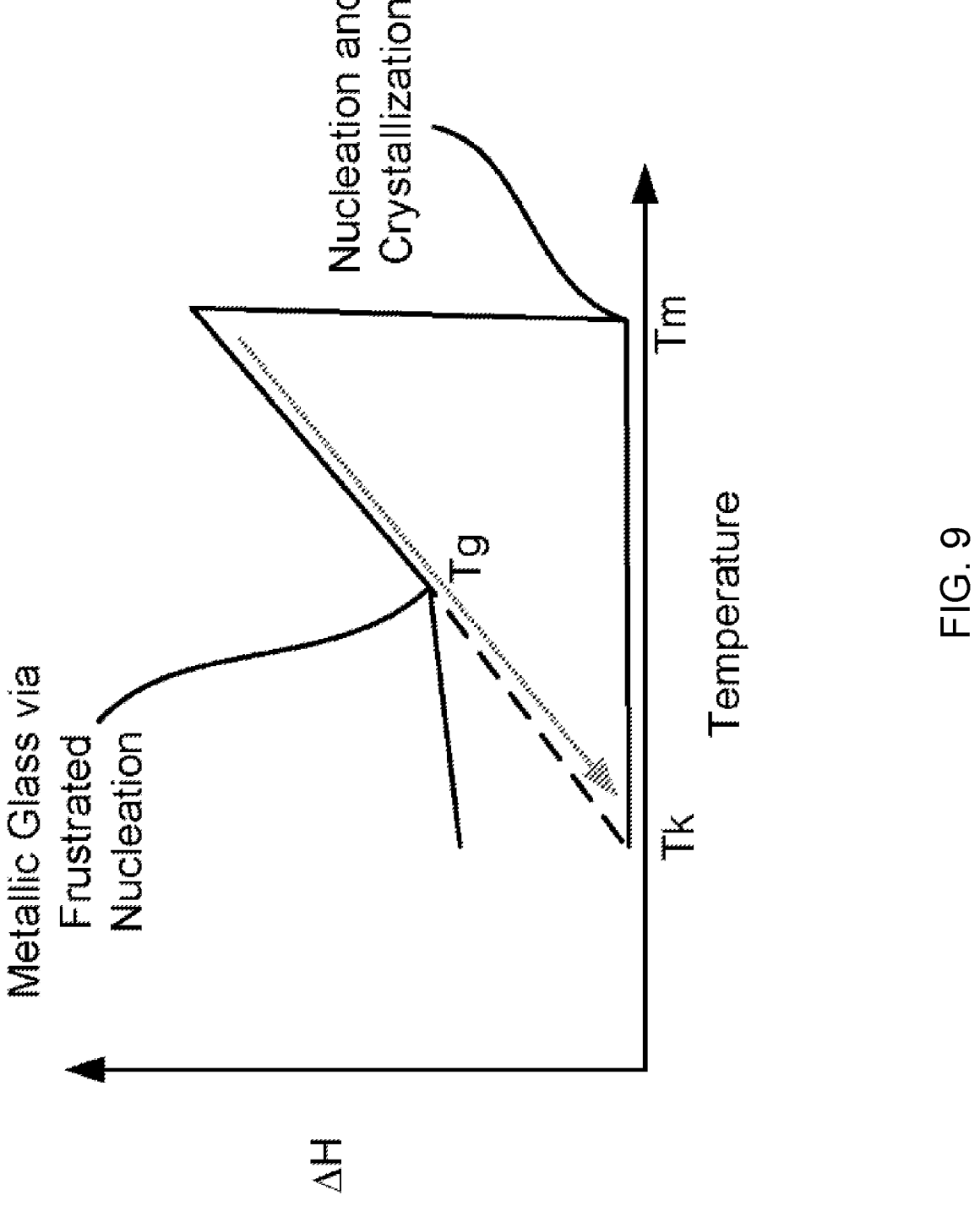
FIG. 9 shows a graph illustrating a change in enthalpy vs temperature chart showing a glass transition temperature for an undercooled metal that can be used with undercooled metallic core-shell particles in accordance with one or more arrangements.

With reference to FIG. 9, because shells 20 of metallic core-shell particles 12 frustrate nucleation and crystallization of the cores 18, the cores 18 can be deeply undercooled, yet remain a liquid until the core 18 is cooled to the glass temperature Tg where it is in an amorphous metal state. In some arrangements, the deeply cooled cores 18 may be a polymorphous material with short range order, but lacking crystalline form. The degree of undercooling dictates the properties of the resulting glass. Tk is the Kauzzmann temperature where the extrapolated liquid entropy meets the crystal entropy. In some embodiments, the undercooled particles remain liquidus below the known Tg of the bulk material and may have induced structural organization in the liquid form allowing for low temperature partition-less solidification into a networked amorphous material.

For more information describing the conditions and/or processes to place cores 18 of metallic core-shell particles 12 into undercooled and/or amorphous metal states, reference may be made to: U.S. Provisional Application No. 63/371,994, titled "METHODS AND APPARATUSES FOR SUPERCOOLED MICRO-CAPSULES", and filed Aug. 19, 2022; U.S. Patent Publication 2022/0212250, titled, "SYSTEM AND METHOD FOR MANUFACTURE OF UNDERCOOLDED METALIC CORE-SHELL PARTICLES", and filed Dec. 29, 2021; PCT Patent Publication WO 2017011029 titled "STABLE UNDERCOOLED METALLIC PARTICLES FOR ENGINEERING AT AMBIENT CONDITIONS"; U.S. Pat. No. 10,266,925 titled "STABLE UNDERCOOLED METALLIC PARTICLES FOR ENGINEERING AT AMBIENT CONDITIONS"; and U.S. Patent Publication 2018/0354037 titled "DIRECT PRINTING AND WRITING USING UNDERCOOLED METALLIC CORE-SHELL PARTICLES", all of which are hereby fully incorporated by reference herein.

Transfer Mechanisms 30:

Transfer mechanisms 30 are formed of any suitable size, shape, and design and are configured to transfer inputs (e.g., undercooled metallic core-shell particles 12, flux components 14 and other inputs to SODA 10) from reconstitution assembly 26 and dispenser assembly 28 to mixer assembly 32. In this example arrangement shown, transfer mechanism 30 includes output nozzles 42 configured to direct materials output from reconstitution assembly 26 and dispenser assembly 28 downward into mixer assembly 32. However, the embodiments are not so limited. Rather, it is contemplated that in some various different arrangements, transfer mechanisms 30 may be implemented using various means or methods for transferring material including but not limited to, for example, tubes, pipes, hoses, valves, enclosures, pumps, nozzles, spigots, troughs, channels, spillways, conveyors, and/or any other method or means for transferring input materials. For example, in one or more arrangements, transfer mechanism 30 may be configured to transport materials from reconstitution assembly 26 and dispenser assembly 28 into mixer assembly 32 within an enclosure (not shown). In one or more arrangements, transfer mechanisms 30 may be configured to control one or more environmental factors within such enclosure including but not limited to, for example: temperature, humidity, atmospheric gases present, atmospheric pressure, and/or any other environmental factors.

Particle Scale Measurements:

In one or more arrangements, flow control assembly 56 and/or transfer mechanisms 30 are configured to meter undercooled metallic core-shell particles 12 from meter assembly 50 to mixer assembly 32 on a single particle scale. As one illustrative example, in one or more arrangements, flow control assembly 56 and/or transfer mechanisms 30 may include a nozzle (e.g., nozzle 42) having an outlet opening that is slightly smaller than the undercooled metallic core-shell particles 12. Due to the liquid state of cores 18 and elasticity of shells 20, the undercooled metallic core-shell particles 12 are able to pass through the outlet opening of the nozzle 42 by deforming slightly as they are moved through the narrowest portion of the nozzle 42. After passing though the nozzle 42, the undercooled metallic core-shell particles 12 return to their original shape. The temporary deformation of the undercooled metallic core-shell particles 12 by the nozzle 42 helps facilitate outputting of single particles 12 at a time. In this manner, in one or more arrangements, SODA 10 is capable of measuring undercooled metallic core-shell particles 12 for production of solder paste 16 with high accuracy. Additionally or alternatively, on one or more arrangements, nozzle 42 may help filter metallic core-shell particles 12 to prevent larger particles and/or solid core metallic core-shell particles 12 from passing therethrough.

Dispenser Assembly 28:

Dispenser assembly 28 is formed of any suitable size, shape, and design and is configured to dispense measured amounts of flux components 14 and/or premixed fluxes to be mixed with undercooled metallic core-shell particles 12 output from reconstitution assembly 26. In the arrangement shown, as one example, dispenser assembly 28 includes a housing 124 and a plurality of meter assemblies 126. Housing 124 is formed of any suitable size, shape, and design and is configured to house meter assemblies 126. In the arrangement shown, as one example, housing 124 is a generally rectangular shaped enclosure having a front 134, a back 136, a top 138, a bottom 140, and opposing sides 142, forming a hollow interior 144. In this example arrangement, housing 124 includes a set of holes 146 which provide access to facilitate connection of transfer mechanism 24 and transfer mechanism 30 to meter assemblies 126 positioned within hollow interior 144.

Meter Assemblies 126:

Meter assemblies 126 are formed of any suitable size, shape, and design and are configured to receive flux components 14 from containers 22b, 22c, and 22d via transfer mechanisms 24 and transfer measured amounts of one or more of components 14, as directed by process control system 36, to mixer assembly 32 via transfer mechanism 30. In some various arrangements, meter assemblies 126 may use various methods and means for metering including but not limited to, for example, fluted feed meters, cup feed meters, internal double run meters, cell feed meters, brush feed meters, auger feed meters, picker wheel meters, star wheel meters, differential pressure flow meters, velocity flow meters, positive displacement flow meters, mass flow meters, closed pipe flow meters, open channel flow meters, flow control valves, and/or any other means or method for dispersing amounts of materials.

Mixer Assembly 32:

Mixer assembly 32 is formed of any suitable size, shape, and design and is configured to receive and mix (or otherwise disperse) undercooled metallic core-shell particles 12 output by reconstitution assembly 26 to produce solder paste 16 with flux components 14 and/or flux dispensed by dispenser assembly 28. In the arrangement shown, as one example, mixer assembly 32 includes a container 156, an impeller 158, shaft 160, a motor 162, and an output valve among other components. However, the embodiments are not so limited. Rather, it is contemplated that in some various arrangements, the flux components 14 and/or flux dispensed by dispenser assembly 28 may be combined with undercooled metallic core-shell particles 12 output by reconstitution assembly 26 using various methods or means for mixing/dispersing including but not limited to, paddle mixers, stir type mixers, agitator mixers, static mixers, drum type mixers, blenders, planetary mixers, eroder type mixers, turbine type mixers, high-shear mixers, rotor-stator mixers, a homogenizer mixer, folding mixers, and/or any means of method for mixing/dispersing solder paste ingredients.

In one or more arrangements, mixer assembly 32 includes two mixing stages to inhibit damages to undercooled metallic-core shell particles 12 while mixing. For example, while dry undercooled metallic-core shell particles 12 may make direct contact with each other when mixed, which may cause damage to undercooled metallic-core shell particles 12.

In one or more arrangements, mixer assembly 32 includes a first mixing stage followed by a second mixing stage. In one or more arrangements, the first mixing stage may be configured to more gently mix undercooled metallic-core shell particles 12 with flux components 14 to coat undercooled metallic-core shell particles 12 with flux components 14. Through careful observation, it has been surprisingly discovered that folding type mixers are able to coat undercooled metallic-core shell particles 12 with flux components 14 without damaging the undercooled metallic-core shell particles 12. After the metallic-core shell particles 12 are coated, the metallic-core shell particles 12 and with flux components 14 are more thoroughly processed by a second mixing stage to produce a solder paste 16 with the metallic-core shell particles 12 and with flux components 14 uniformly dispersed therein.

Container 156:

Container 156 is formed of any suitable size, shape, and design and is configured to receive undercooled metallic core-shell particles 12 output by reconstitution assembly 26 and flux components 14 and/or flux dispensed by dispenser assembly 28. In the arrangement shown, as one example, container 156 has a circular bottom 172 and a generally cylindrical shaped sidewall 170 extending upward from bottom 172 to an open upper end 174.

Solder Paste Dispenser 190:

Solder paste dispenser 190 is formed of any suitable size, shape, and design and is configured to output mixed solder paste 16 from container 156. In the arrangement shown, solder paste dispenser 190 is a valve positioned in sidewall 170 proximate to bottom 172. However, the arrangements are not so limited. Rather, it is contemplated that in some various different arrangements, solder paste dispenser 190 may be implemented using various means or methods for transferring material including but not limited to, for example, tubes, pipes, hoses, housings, valves, pumps, nozzles, spigots, troughs, channels, spillways, conveyors, injectors and/or any other method or means for transferring solder paste 16.

Particle Scale Measurements:

In one or more arrangements, solder paste dispenser 190 is configured to dispense small amounts of solder paste 16 with high accuracy. For example, in one or more arrangements, solder paste dispenser 190 may be configured to dispense small amounts of solder paste 16 (e.g., an amount containing a single undercooled metallic core-shell particle 12).

As an illustrative example, in one or more arrangements, solder paste dispenser 190 may include a nozzle (not shown) having an outlet opening that is slightly smaller than the undercooled metallic core-shell particles 12. As discussed with reference to flow control assembly 56 and transfer mechanism 30, due to the liquid state of cores 18 and elasticity of shells 20, the undercooled metallic core-shell particles 12 are able to pass through the outlet opening of the nozzle of solder paste dispenser 190 by deforming slightly as they are moved through the most narrow portion of the nozzle. After passing though the nozzle of solder paste dispenser 190, the undercooled metallic core-shell particles 12 return to their original shape. The temporary deformation of the undercooled metallic core-shell particles 12 in solder paste 16 by the nozzle helps facilitate outputting of single particles 12 at a time. In this manner, in one or more arrangements, solder paste dispenser 190 is capable of small amounts of solder paste 16 with high accuracy. Dispensing solder paste 16 with such high accuracy is thought to be particularly useful for soldering circuits, chips, and boards as electronics continue to be scaled down to smaller and smaller dimensions. Additionally or alternatively, on one or more arrangements, nozzle may help filter metallic core-shell particles 12 to prevent larger particles and/or solid core metallic core-shell particles 12 from being dispensed by solder paste dispenser 190.

Impeller 158:

Impeller 158 is formed of any suitable size, shape, and design and is configured to mix contents of container 156 when rotated. In various different arrangements, impellers 158 may use various different types of impellers including but not limited to, for example, open impellers, semi-closed impellers, closed or shrouded impellers, flexible impellers, and/or any other type of impeller. Such impellers may be configured for axial flow, radial flow, right hand rotation, left hand rotation, and/or any combination of these and other configurations of impellers.

Shaft 160:

Shaft 160 is formed of any suitable size, shape, and design and is configured to operably connect impeller 158 to motor 162. In the arrangement shown, shaft 160 has an elongated cylindrical shape extending between a lower end 182 and an upper end 180. In this example arrangement, lower end 182 is connected to impeller 158 and upper end 180 is connected to an output shaft of motor 162.

Motor 162:

Motor 162 is formed of any suitable size, shape and design and is configured to generate mechanical movement. In the arrangement shown, as one example, motor 162 is an electric motor (e.g., a DC motor or an AC motor) configured to convert electric power into rotational motion. However, embodiments are not so limited. For example, in some arrangements, motor 162 may be an internal combustion engine, a fluid driven engine (e.g., steam, water, and/or air driven), or any other type of motor or engine. In the arrangement shown, a drive shaft of motor 162 is operatively connected to and is configured to rotate shaft 160 and impeller 158 when operated. In one or more arrangements, speed of motor 162 is adjustable to facilitate adjustment of the speed at which impeller 158 is rotated during operation.

Process Control System 36:

In one or more arrangements, SODA 10 includes a process control system 36. Process control system 36 is formed of any suitable size, shape and design and is configured to control reconstitution assembly 26, dispenser assembly 28, mixer assembly 32 and/or other components of SODA 10 to facilitate on demand production of solder paste 16. In the arrangement shown, as one example, process control system 36 includes a control circuit 220, user interface 222, and/or sensors 224, among other components.

Control Circuit 220:

Control circuit 220 is formed of any suitable size, shape, design, technology, and in any arrangement and is configured to control operation of other components of process control system 36 to facilitate operation of SODA 10 in response to input from user interface 222 and/or signals of sensors 224. Sensors 224 may include but are not limited to, for example, pressure sensors, temperature sensors, chemical sensors (e.g., PH sensors), flow rate sensors, rotation speed sensors, and/or any other type of sensor. In the arrangement shown, as one example implementation, process control system 36 control circuit 220 includes a processing circuit 228 and memory 230 having software code 236 or instructions that facilitates the computational operation of process control system 36. Processing circuit 228 may be any computing device that receives and processes information and outputs commands according to software code 236 stored in memory 230.

Memory 230 may be any form of information storage such as flash memory, ram memory, dram memory, a hard drive, or any other form of memory. Processing circuit 228 and memory 230 may be formed of a single combined unit. Alternatively, processing circuit 228 and memory 230 may be formed of separate but electrically connected components. Alternatively, processing circuit 228 and memory 230 may each be formed of multiple separate but communicatively connected components.

Software code 236 is any form of instructions or rules that direct processing circuit 228 how to receive, interpret and respond to information to operate as described herein. Software code 236 or instructions is stored in memory 230 and accessible to processing circuit 228. As an illustrative example, in one or more arrangements, software code 236 or instructions may configure processing circuit 228 of process control system 36 to control dispensing of flux components 14 and/or flux dispensed by meter assemblies 126 of dispenser assembly 28. Additionally or alternatively, in one or more arrangements, software code 236 or instructions may configure processing circuit 228 to control metering of metallic core-shell particles 12 by meter assembly 50, heating of the metallic core-shell particles 12 by heating stage assembly 52, cooling of the metallic core-shell particles 12 by cooling stage assembly 54, and/or flow rate of metallic core-shell particles 12 by flow control assembly 56. Additionally or alternatively, in one or more arrangements, software code 236 or instructions may configure processing circuit 228 to control mixing of undercooled metallic core-shell particles 12 and flux components 14 and/or flux by mixer assembly 32.

In one or more arrangements, process control system 36 is configurable by a user via user interface 222 to customize the selection and amounts of flux components 14, selection and amounts of undercooled metallic core-shell particles 12, and/or processes performed by reconstitution assembly 26, dispenser assembly 28, mixer assembly 32 and/or other components of SODA 10 to facilitate production of customized solder paste 16.

Communication Circuit 232:

Communication circuit 232 is formed of any suitable size, shape, design, technology, and in any arrangement and is configured to facilitate communication with devices to be controlled, monitored, and/or alerted by process control system 36. In one or more arrangements, as one example, communication circuit 232 includes a transmitter (for one way communication) or transceiver (for two way communication). In various arrangements, communication circuit 232 may be configured to communicate with various components of SODA 10 using various wired and/or wireless communication technologies and protocols over various networks and/or mediums including but not limited to, for example, Serial Data Interface 12 (SDI-12), UART, Serial Peripheral Interface, PCI/PCIe, Serial ATA, ARM Advanced Microcontroller Bus Architecture (AMBA), USB, Firewire, RFID, Near Field Communication (NFC), infrared and optical communication, 802.3/Ethernet, 802.11/WIFI, Wi-Max, Bluetooth, Bluetooth low energy, UltraWideband (UWB), 802.15.4/ZigBee, ZWave, GSM/EDGE, UMTS/HSPA+/HSDPA, CDMA, LTE, FM/VHF/UHF networks, and/or any other communication protocol, technology or network.

User Interface 222:

User interface 222 is formed of any suitable size, shape, design, technology, and in any arrangement and is configured to facilitate user control and/or adjustment of various components of SODA 10. In one or more arrangements, as one example, user interface 222 includes a set of inputs 240 (not shown). Inputs 240 are formed of any suitable size, shape and design and are configured to facilitate user input of data and/or control commands. In various different arrangements, inputs 240 may include various types of controls including but not limited to, for example, buttons, switches, dials, knobs, a keyboard, a mouse, a touch pad, a touchscreen, a joystick, a roller ball, or any other form of user input. Optionally, in one or more arrangements, user interface 222 includes a display 242 (not shown). Display 242 is formed of any suitable size, shape, design, technology, and in any arrangement and is configured to facilitate display information of settings, sensor readings, time elapsed, and/or other information pertaining to processing of materials by SODA 10. In one or more arrangements, display 242 may include, for example, LED lights, meters, gauges, screen or monitor of a computing device, tablet, and/or smartphone. Additionally or alternatively, in one or more arrangements, the inputs 240 and/or display 242 may be implemented on a separate device that is communicatively connected to process control system 36. For example, in one or more arrangements, operation of process control system 36 may customized using a smartphone or other computing device that is communicatively connected to the process control system 36 (e.g., via Bluetooth, WIFI, and/or the internet).

In Operation:

FIG. 7 shows an example process for producing solder having undercooled metallic core-shell particles 12 on demand. At process block 250, metallic core-shell particles 12 are produced. Optionally, at process block 252, cores 18 of some or all of the undercooled metallic core-shell particles 12 are permitted to return to a solid state. At process block 254, solid core metallic core-shell particles 12 are transported to a location of use. On site, solder paste 16 is manufactured on demand as needed at decision block 256. At process block 258, cores 18 of metallic core-shell particles 12 are reconstituted to an undercooled liquid state. At process block 260, the undercooled metallic core-shell particles 12 are mixed with flux components 14 and/or premixed solder flux to produce solder paste 16 with desired characteristics. At process block 262, the prepared solder paste 16 is output and/or packaged for use. However, the embodiments are not so limited. Rather, it is also contemplated that in one or more arrangements, undercooled metallic core-shell particles 12 are used without undergoing a reconstitution process as outlined in block 258 and instead proceed from block 250 to block 260.

FIG. 8 shows another example process for producing solder having undercooled metallic core-shell particles 12 on demand. In this example process, SODA 10 is configurable by a user to customize one or more characteristics of the solder paste 16 that will be produced. At process block 270, metallic core-shell particles 12 are produced. Optionally, at process block 272, cores 18 of the undercooled metallic core-shell particles 12 are permitted to return to a solid state. At process block 274, solid core metallic core-shell particles 12 are transported to a location of use. On site, solder paste 16 is manufactured on demand as needed at decision block 276.

In this illustrative example, control inputs indicating one or more desired parameters selected by a user are received by process control system 36 at process block 278. In this illustrative example, a user inputs the amount of solder paste 16 to be produced and a desired flow temperature of the solder paste 16. However, the embodiments are not so limited. Rather, it is contemplated that in one or more arrangements, a user may configure process control system 36 of SODA 10 to adjust various characteristics of solder paste 16 including but not limited to flow temperature, viscosity, slump, working life, tack, response-to-pause, electrical conductivity, ionic conductivity, rollability, stencil release, brick height, cleanability, color, and/or any other characteristic.

At process block 280, process control system 36 selects a type of undercoolable metallic core-shell particle 12 from those available in containers 22 that is suitable for the product design parameters specified by the user. At process block 282, process control system 36 also determines an amount of undercoolable metallic core-shell particles 12 required based on the desired amount of solder paste 16 specified by the user.

At process block 284, the determined amount of the selected undercoolable metallic core-shell particles 12 are dispersed into reconstitution assembly 26. At process block 286 cores 18 of metallic core-shell particles 12 are reconstituted to an undercooled liquid state and then moved to mixer assembly 32. Additionally or alternatively, it is also contemplated that in one or more arrangements, the undercooled metallic core-shell particles 12 do not return to a solid state as suggested in process block 272 and therefore bypass the reconstitution process of process block 286. At process block 288, process control system 36 determines flux components 14 (and/or premixed solder fluxes) and amounts based on the desired amount of flux, flow temperature and/or other characteristics specified by the user and based on the selected type of metallic core-shell particles 12. At process block 290, the determined amounts of the determined flux components 14 are dispensed into mixer assembly 32.

At process block 292, the undercooled metallic core-shell particles 12 are mixed with flux components 14 and/or premixed solder flux to produce solder paste 16 with desired characteristics specified by the user. At process block 294, the prepared solder paste 16 is output and/or packaged for use.

From the above discussion it will be appreciated that one or more arrangements presented herein improve upon the state of the art and provide a method and/or apparatus: that improve upon the state of the art; that produce a solder paste that includes undercooled metallic core-shell particles; that avoids logistical constraints presented by shelf life of conventional solder pastes; that increase shelf life of individual solder paste components; that produce a solder paste that can flow high temperature solders at lower temperatures than conventional solder pastes; that eliminates the need for cold transportation or storage; that can be customized to produce a solder paste for different solder applications or manufacture of different products; that is easy to use; that improves functionality; that improves process efficiency, reduces waste, and increases flexibility; that permits a sample to be removed for analysis and/or certification; that uses a minimum number of parts; that is durable; and/or that has a long useful life. These and other objects, features, or advantages of the present disclosure will become apparent from the specification and claims.

Although the present disclosure has been described with respect to certain illustrative embodiments, those skilled in the art will appreciate is not limited to these embodiments and that changes and modifications can be made therein within the scope of the disclosure as set forth in the appended claims.

What is claimed is:

1. A system for manufacturing solder paste, the system comprising a reconstitution assembly configured to process solid core metallic core-shell particles, having a metallic core in a solid state surrounded by a shell, to place the metallic cores into an undercooled liquid state to form a plurality of undercooled metallic core-shell particles.

2. The system of claim 1, wherein the reconstitution assembly is configured to process the solid core metallic core-shell particles to undercool the metallic cores to a degree that the metallic cores are configured to transition into an amorphous metal state.

3. The system of claim 1, further comprising:
a set of containers; and
a first transfer mechanism configured to transfer the solid core metallic core-shell particles from one or more of the set of containers to the reconstitution assembly.

4. The system of claim 3, further comprising:
a dispenser assembly configured to dispense one or more of a set of flux components.

5. The system of claim 1, further comprising a dispenser assembly configured to dispense one or more of a set of flux components.

6. The system of claim 1, further comprising:
a dispenser assembly configured to dispense one or more of a set of flux components; and
a process control system is configured to control operation of the reconstitution assembly and the dispenser assembly.

7. The system of claim 1, further comprising:
a dispenser assembly configured to dispense one or more of a set of flux components; and
a process control system configured to control operation of the reconstitution assembly and the dispenser assembly to produce the solder paste with one or more characteristics specified by user commands input to the process control system.

8. The system of claim 7,
wherein in response to the user commands, the process control system determines the one or more of the set of flux components and causes the dispenser assembly to dispense the one or more of the set of flux components.

9. The system of claim 7, wherein in response to the user commands, the process control system selects a type of solid core metallic core-shell particle from a plurality of different types of solid core metallic core-shell particles and causes the reconstitution assembly to form the plurality of undercooled metallic core-shell particles from the selected type of solid core metallic core-shell particle.

10. The system of claim 7, wherein the one or more characteristics are selected from a group including flow temperature, viscosity, slump, working life, tack, response-to-pause, conductivity, cleanability, and melting temperature.

11. The system of claim 1, further comprising a dispenser assembly configured to dispense a plurality of different flux components.

12. The system of claim 1, further comprising a dispenser assembly configured to dispense a plurality of different premixed fluxes.

13. The system of claim 1, further comprising a dispenser assembly configured to dispense one or more flux components and one or more premixed fluxes.

14. The system of claim 1, further comprising a transfer mechanism configured to meter and transfer the plurality of undercooled metallic core-shell particles one at a time.

15. A method for manufacturing solder paste, comprising:

providing a plurality of solid core metallic core-shell particles, having a shell formed around a metal core; and transitioning the metal cores of the solid core metallic core-shell particles into an undercooled liquid state to produce undercooled metallic core-shell particles.

16. The method of claim 15, further comprising transitioning the metal cores of the solid core metallic core-shell particles into an amorphous metal state.

17. The method of claim 15, wherein providing the plurality of solid core metallic core-shell particles includes:

producing a set of metallic core-shell particles with cores in an undercooled liquid state;

allowing cores of the set of metallic core-shell particles to transition to a solid state; and returning the cores of the set of metallic core-shell particles from the solid state to the undercooled liquid state.

18. The method of claim 15, wherein providing the plurality of solid core metallic core-shell particles includes:

producing, at a first location, a set of metallic core-shell particles with cores in an undercooled liquid state;

allowing cores of the set of metallic core-shell particles to transition to a solid state;

shipping the set of metallic core-shell particles with cores in the solid state from the first location to a second location using non-refrigerated transportation; and returning, at the second location, the cores of the set of metallic core-shell particles from the solid state to the undercooled liquid state.

19. The method of claim 15, wherein providing the plurality of solid core metallic core-shell particles includes:

producing a set of metallic core-shell particles with cores in an undercooled liquid state;

allowing cores of the set of metallic core-shell particles to transition to a solid state; and storing, using non-refrigerated storage, the set of metallic core-shell particles with cores in the solid state.

20. The method of claim 17, wherein transitioning the metal cores of the solid core metallic core-shell particles to the undercooled liquid state includes:

heating a set of metallic core-shell particles to a first temperature higher than a melting temperature of cores of the set of metallic core-shell particles; and cooling the set of metallic core-shell particles to a second temperature below the melting temperature while retaining the cores of the set of metallic core-shell particles in a liquid state.

21. The method of claim 15, wherein:

the plurality of solid core metallic core-shell particles are produced at a first location;

the metal cores of the solid core metallic core-shell particles are transitioned to the undercooled liquid state at a second location; and the method further comprises:

mixing, at the second location, a first amount of the undercooled metallic core-shell particles with a first set of flux components to produce a first solder paste; and mixing, at the second location, a second amount of the undercooled metallic core-shell particles with a second set of flux components to produce a second solder paste that has characteristics that are different from the first solder paste.

22. The method of claim 15, further comprising mixing the undercooled metallic core-shell particles with flux.

* * * * *